United States Patent
Kim et al.

(10) Patent No.: US 9,769,860 B2
(45) Date of Patent: Sep. 19, 2017

(54) METHOD AND DEVICE FOR PROCESSING PROXIMITY-BASED SERVICE IN WIRELESS COMMUNICATION SYSTEM

(71) Applicant: LG ELECTRONICS INC., Seoul (KR)

(72) Inventors: Hakseong Kim, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 70 days.

(21) Appl. No.: 14/775,561

(22) PCT Filed: Apr. 8, 2014

(86) PCT No.: PCT/KR2014/003022
§ 371 (c)(1),
(2) Date: Sep. 11, 2015

(87) PCT Pub. No.: WO2014/168396
PCT Pub. Date: Oct. 16, 2014

(65) Prior Publication Data
US 2016/0037569 A1 Feb. 4, 2016

Related U.S. Application Data

(60) Provisional application No. 61/809,425, filed on Apr. 8, 2013, provisional application No. 61/819,666, filed on May 6, 2013.

(51) Int. Cl.
*H04W 76/02* (2009.01)
*H04W 72/06* (2009.01)
(Continued)

(52) U.S. Cl.
CPC ......... *H04W 76/023* (2013.01); *H04W 4/008* (2013.01); *H04W 4/08* (2013.01);
(Continued)

(58) Field of Classification Search
CPC ..... H04W 76/023; H04W 4/08; H04W 8/005; H04W 72/0446; H04W 72/0413;
(Continued)

(56) References Cited

U.S. PATENT DOCUMENTS

9,019,943 B2 * 4/2015 Dwivedi ............. H04W 76/023
370/338
9,560,685 B2 * 1/2017 Kim .................... H04W 72/042
(Continued)

FOREIGN PATENT DOCUMENTS

KR 10-1186620 9/2012
KR 10-2012-0123553 11/2012
(Continued)

OTHER PUBLICATIONS

PCT International Application No. PCT/KR2014/003022, Written Opinion of the International Searching Authority dated Jun. 27, 2014, 1 page.
(Continued)

*Primary Examiner* — Khawar Iqbal
(74) *Attorney, Agent, or Firm* — Lee Hong Degerman Kang Waimey

(57) ABSTRACT

One embodiment of the present invention provides a method and device for performing a device-to-device (D2D) service in a wireless communication system and, more particularly, provides a method performed by a group leader device supporting the D2D service in a wireless communication system comprising a seller device and a customer device which support the D2D service. The group leader device forms a D2D terminal group including a plurality of customer devices. Information on the D2D terminal group is provided to the seller device so as to enable a reasonable transaction between the seller and a customer to be carried out.

6 Claims, 10 Drawing Sheets

(51) Int. Cl.
*H04W 4/08* (2009.01)
*H04W 4/00* (2009.01)
*H04W 72/04* (2009.01)
*H04W 8/00* (2009.01)

(52) U.S. Cl.
CPC ..... *H04W 72/042* (2013.01); *H04W 72/0413* (2013.01); *H04W 72/0446* (2013.01); *H04W 8/005* (2013.01)

(58) Field of Classification Search
CPC ... H04W 72/042; H04W 8/00; H04W 40/246; H04W 67/16
USPC ................. 455/450, 41.1, 406, 412.1–414.4; 370/329
See application file for complete search history.

(56) References Cited

U.S. PATENT DOCUMENTS

| | | | |
|---|---|---|---|
| 2013/0005374 A1 | 1/2013 | Uusitalo et al. | |
| 2013/0083779 A1 | 4/2013 | Ahn et al. | |
| 2013/0250771 A1* | 9/2013 | Yu | H04W 76/023 370/241 |
| 2013/0272196 A1* | 10/2013 | Li | H04W 72/044 370/328 |
| 2013/0275311 A1* | 10/2013 | Kohn | G06Q 30/0609 705/71 |
| 2014/0056220 A1* | 2/2014 | Poitau | H04W 40/246 370/328 |
| 2014/0206407 A1 | 7/2014 | Kim et al. | |
| 2014/0219095 A1* | 8/2014 | Lim | H04W 72/085 370/235 |
| 2014/0228061 A1* | 8/2014 | Draznin | H04W 4/12 455/466 |
| 2015/0105082 A1* | 4/2015 | Cheng | H04W 12/02 455/436 |
| 2015/0131475 A1* | 5/2015 | Van Phan | H04W 84/18 370/254 |
| 2015/0181406 A1* | 6/2015 | Seo | H04W 76/023 370/329 |
| 2015/0282132 A1* | 10/2015 | Kim | H04W 8/005 370/329 |
| 2015/0289080 A1* | 10/2015 | Wu | H04W 76/02 370/329 |
| 2015/0319765 A1* | 11/2015 | Zhu | H04W 28/16 370/329 |
| 2015/0334754 A1* | 11/2015 | Lei | H04W 8/005 455/422.1 |
| 2016/0007336 A1* | 1/2016 | Fukuta | H04W 52/383 455/426.1 |
| 2016/0241325 A1* | 8/2016 | Raghothaman | H04W 36/00 |

FOREIGN PATENT DOCUMENTS

| | | |
|---|---|---|
| KR | 10-2012-0125185 | 11/2012 |
| WO | 2011/100497 | 8/2011 |
| WO | 2012088470 | 6/2012 |
| WO | 2012/159270 | 11/2012 |
| WO | 2013/022307 | 2/2013 |
| WO | 2013035999 | 3/2013 |

OTHER PUBLICATIONS

European Patent Office Application Serial No. 14783450.1, Search Report dated Dec. 9, 2016, 15 pages.
Tsolkas et al., "LTE-A Access, Core, and Protocol Architecture for D2D Communication", Department of Informatics and Telecommunications, XP055304882, 2014, 18 pages.

* cited by examiner

METHOD AND DEVICE FOR PROCESSING PROXIMITY-BASED SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2014/003022, filed on Apr. 8, 2014, which claims the benefit of U.S. Provisional Application No. 61/809,425, filed on Apr. 8, 2013 and 61/819,666, filed on May 6, 2013, the contents of which are all hereby incorporated by reference herein in their entirety.

BACKGROUND OF THE INVENTION

Field of the Invention

The present embodiment is related to wireless communication system, and more particularly, to a method and apparatus for processing proximity-based service in wireless communication system supporting device to device service Related Art Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Meanwhile, in consideration of the requests of service provider that provides services to users, seek the benefit from the improvement of performances of the existing radio access or network and the way of recouping the investment costs for wireless communication systems which have been already invested so that the LTE system has been evolved in the form of maintaining or coexisting the compatibility with 2G communication system, which is the global system for mobile communications (GSM) based on the time division multiple access (TDMA), and with 3G communication system, which is the universal mobile telecommunication system (UMTS) based on the wideband code division multiple access (W-CDMA).

Particularly, with the advent of smart phones and tablet personal computers (PCs) recently, the users of actual communication devices require the services that enable you to easily obtain or share the information desired at any place and any time they want. However, it is not easy to effectively provide real-time information that is trivial but useful for users in real life situation due to the complexity of system or time delay of the wireless communication systems.

Meanwhile, a device to device (D2D) service, which is performed through a direct communication link among communication devices, without going through a network entity such as a base station, has emerged as an issue. This may be regarded that the wireless communication system is urgently needed to be developed/improved to support the environment in which users can share and obtain various information. In relation to this, the way and technique of effective data transmission and reception in wireless communication systems, which support the D2D service, are needed.

SUMMARY OF THE INVENTION

Technical features disclosed in the present specification relate to a method of effectively processing a proximity-based service.

An example according to the present specification provides a method performed by a group leader device supporting a device-to-device (D2D) service in a wireless communication system including a seller device and a customer device which support the D2D service.

The method includes: creating, by the group leader device, a D2D user equipment (UE) group in which the customer device is included as a member, receiving a discovery signal from the seller device in the group leader device which is in a radio resource control (RRC) idle mode, establishing an RRC connection between a base station and the group leader device in response to the discovery signal, after the RRC connection is established between the base station and the group leader device, transmitting to the base station a D2D link setup request message for setting up a D2D link between the seller device and the group leader device on the basis of identification information of the seller device, setting up a D2D link between the seller device and the group leader device by using a resource scheduled by the base station, transmitting group information related to the D2D UE group and negotiation information of the group leader device to the seller device through the D2D link between the seller device and the group leader device, and receiving response information regarding the group information and the negotiation information from the seller device through the D2D link between the seller device and the group leader device, wherein the creating of the D2D UE group includes: receiving a discovery signal from a candidate device supporting the D2D service in the group leader device which is in the RRC idle mode, establishing an RRC connection between the group leader device and the base station in response to the discovery signal from the candidate device, after the RRC connection is established between the group leader device and the base station, requesting resource allocation for the D2D link between the candidate device and the group leader device, on the basis of identification information for the candidate device, receiving temporal negotiation information of the candidate device through the D2D link between the candidate device and the group leader device, and if the temporal negotiation information corresponds to negotiation information of the group leader device, allowing the candidate device to be included in the D2D UE group.

When communication is performed according to a method and apparatus disclosed in the specification described below, a seller and a customer can effectively perform communication through a device to device (D2D) link.

DESCRIPTION OF EXEMPLARY EMBODIMENTS

Figure 1:
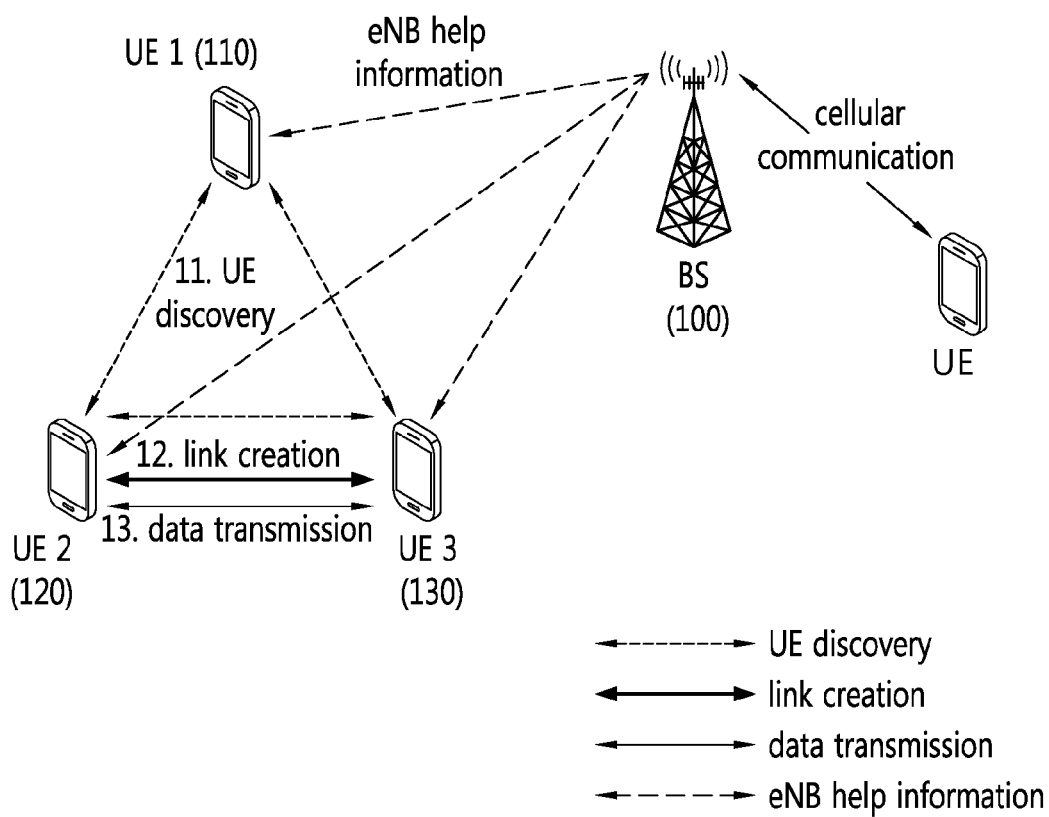
FIG. 1 schematically illustrates a structure of a wireless communication system to which the present embodiment is applied.

Hereinafter, the preferred embodiment of the present invention now will be described in detail by reference to the accompanying exemplary drawings in this specification. In attaching reference numerals to elements in each drawing, it should be understood that the same reference numeral is used for the same element even if the element is shown in different drawings. In addition, in case that the detailed description for the related known elements and functions is determined to obscure the inventive concept in this specification, the redundant description for the same element will be omitted.

In addition, the present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

FIG. 1 schematically illustrates a structure of a wireless communication system to which the present invention is applied. The drawing depicts a network structure of evolved-universal mobile telecommunications system (E-UMTS). The E-UMTS system is also called long term evolution (LTE) or LTE-advanced (LTE-A) system, and refers to a packet based system to provide various communication services such as voice, packet data, and so on.

Referring to FIG. 1, the E-UTRAN includes an evolved-NodeB (eNB) 100 that provides a control plane and a user plane for user equipments (UEs) 110, 120 and 130. The UEs 110, 120 and 130 may be fixed or have mobility, and may be called other terms such as a mobile station (MS), an advanced mobile station (AMS), a user terminal (UT), a subscriber station (SS), a wireless device, and the like.

The eNB 100 generally refers to a station that communicates with the UEs 110, 120 and 130, and may be called other terms such as a base station (BS), a base transceiver system (BTS), an access point (AP), a femto eNB, a pico-eNB, a Home nodeB, relay, and so on. The eNB 100 may provide services for a UE through at least one cell. The cell may signify a geographical region that provides communication service by the eNB 100, or signify a specific frequency band. Or, the cell may signify downlink frequency resources and uplink frequency resources. Or, the cell may signify the combination of the downlink frequency resources and optional uplink frequency resources. In addition, the cell should be interpreted as inclusive meaning that represents a partial region which is covered by the eNB 100. And the cell may be defined as a mega cell, a macro cell, a micro cell, a pico cell, a femto cell, etc. according to the size, and the cell should be interpreted as inclusive meaning that includes all of various coverage and regions according to the present invention.

Hereinafter, downlink refers to transmission link from the eNB 100 to the UEs 110, 120 and 130, and uplink refers to transmission link from the UEs 110, 120 and 130 to the eNB 100. In downlink, a transmitter may be a part of the eNB 100 and a receiver may be a part of the UEs 110, 120 and 130. In uplink, a transmitter may be a part of the UEs 110, 120 and 130, and a receiver may be a part of the eNB 100.

Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA in the present invention. In addition, as the uplink transmission and the downlink transmission, a Time Division Duplex (TDD) scheme transmitted using different times may be used. Or, a Frequency Division Duplex (FDD) scheme transmitted using different frequencies may be used.

Meanwhile, the physical layers applied to the present invention include a physical downlink control channel (PDCCH), a physical control format indicator channel (PCFICH), a physical hybrid ARQ indicator channel (PHICH), a physical uplink control channel (PUCCH), and so on. Herein, the PDCCH may carry the resource allocation and the transmission format of a downlink shared channel (DL-SCH), the resource allocation information of a uplink shared channel (UL-SCH), the paging information on a PCH, the system information of the DL-SCH, the resource allocation of higher layer control message such as a random access response transmitted on a PDSCH, the set of transmission power control command for individual UEs in an arbitrary UE group and the activation of voice over internet protocol (VoIP), and so on. The PCFICH carries the number of OFDM symbol (i.e., size of control region) which is used for transmission of control channels in a subframe. The PHICH carries Acknowledgement (ACK)/Non-acknowledgement (NACK) signals which are the response signals to a Hybrid Automatic Repeat Request (HARQ) for the uplink transmission. The PUCCH carries the uplink control information such as the HARQ ACK/NACK for downlink transmission, the scheduling request, and a channel quality indicator (CQI).

Furthermore, in recent years, the mobile internet traffic has rapidly increased, and it is anticipated that such a trend will last for the time being. While overload of cellular communication network becomes serious due to the increase of mobile traffic, service providers try to solve the overload problem by introducing LTE, femto cell, wireless LAN, and the like. Such an effort has common ground of trying to decrease the overload of eNB by replacing and expanding infra. Meanwhile, as a method of decreasing the overload without replacing and expanding infra, the D2D communication that sends and receives traffic directly among UEs without infra has been magnified. Although the definition of such a D2D communication is not clearly established at the moment, the D2D communication may signify a direct communication among UEs without any infra of network systems. This signifies a communication that directly exchanges traffic among UEs not by introducing a small eNB such as a femto cell or a pico cell and nor by an eNB. Since such a D2D communication has an advantage in proximity compared with the existing communication through infra, for example, in the aspect of power transmission, if the distance among UEs is close, the communication is available in lower power than the case of exchanging traffic with an eNB located far away, which is more effective. The advantage enables the efficiency of limited radio resources to increase whereas the load of network infra to decrease. The efficiency of limited radio resources signifies that the frequency reuse factor may also be increased since the D2D communication is available in low power and several D2D links are available to communicate even in the same cell.

Particularly, since the D2D communication based on the cellular network has advantages such as power saving, shortening access time, saving frequency resource, and so on, various researches have been published. In addition, since the applications such as social network, mobile advertisement, short distance file transfer, etc. in which mobile traffic has been rapidly increased are considered as applications that are suitable for the D2D communication, basically the demand for D2D communication is anticipated to increase more in the future.

As shown in FIG. 1, such a D2D communication procedure may include a step of peer discovery 11 for searching neighboring D2D UEs in which the D2D communication is available, a step of link generation 12 for connecting a UE which is going to transmit data among D2D UEs found in the step of peer discovery 11 to a wireless link, and a step of data transmission 13 for transmitting traffic among the UEs connected with the wireless link. Although detailed procedure may vary according to actual D2D communication method, it can be said that the above three steps are general.

In more particular, the first step for D2D communication is the step of peer discovery 11. The step of peer discovery 11 is a step that each D2D UE searches other UEs that are available to perform D2D communication nearby. In this step, each of the UEs transmits search signals such that other UEs may find the UE and receives search signals transmitted from other UEs, and finds other UEs that are available to perform D2D communication are located within a range.

The second step for D2D communication is the step of link generation 12. In the step of link generation 12, a UE which is going to transmit data among D2D UEs found in the step of peer discovery 11 is linked to transmit data. Generally, the link is established when a UE sends a signal for requesting a link generation to other UE, the corresponding UE receives the signal and sends a response signal.

When a neighboring UE is found in the step of peer discovery and a link is established among the UEs that are going to exchange data in the step of link generation, the two UEs linked each other exchange data. This step is called the step of data transmission 13. Through the step, the UEs in which D2D link is established perform data transmission on predetermined time and frequency.

Such a D2D communication technique may be divided into a D2D communication based on the cellular network and a D2D communication that does not utilize infra of the cellular network in the least. The D2D communication based on the cellular network uses the information received from an eNB in the step of peer discovery and receives a help from the cellular network when performing resource allocation and power control when transmitting data for traffic transmission. This is more effective in power saving, access time, resource application, etc. that those of the D2D communication that does not utilize infra of the cellular network.

Meanwhile, a Peer discovery technique based on the cellular network may be divided into an A-priori peer discovery technique and an A-posterior peer discovery technique based on target UE to be searched. The A-priori peer discovery technique signifies a technique of performing search among the D2D UEs in which session is not setup. The A-priori peer discovery technique based on the cellular network signifies a way of searching UE using the broadcasting information of eNB and a technique of searching UE through register/request processes by a network entity, for example, a mobile management entity (MME). Hereinafter, this will be briefly described through FIG. 2 and FIG. 3.

Figure 2:
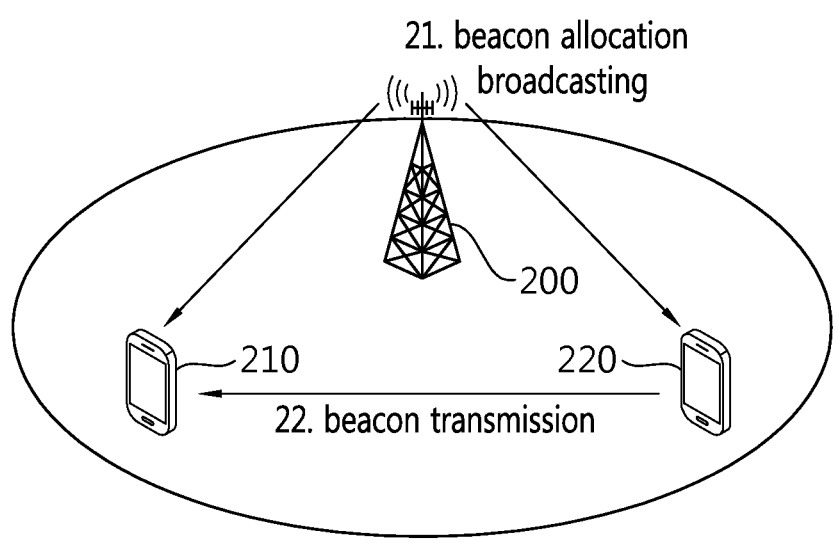
FIG. 2 schematically illustrates a peer discovery procedure using broadcasting information in a wireless communication system to which the present embodiment is applied.

FIG. 2 schematically illustrates a peer discovery procedure using the broadcasting information in a wireless communication system to which the present invention is applied. This is one of the A-priori peer discovery techniques, and a method that UEs search each other using the broadcasting information of eNB will be described.

Referring to FIG. 2, an eNB 200 continuously broadcasts that each of the UEs 210 and 220 is allocated to which beacon resource to the D2D UEs (step, 21). Each UE is available to know the beacon allocated to itself based on the broadcasting information.

Each UE receives beacon assignments that are broadcasted from the eNB, and notifies the existence of the UE to other UEs by transmitting the assigned beacon through a predetermined communication resource (step, 22). Then, each of the UEs searches which D2D UEs are present nearby by searching beacon based on the information broadcasted by the eNB on the time when the beacon is not transmitted.

Figure 3:
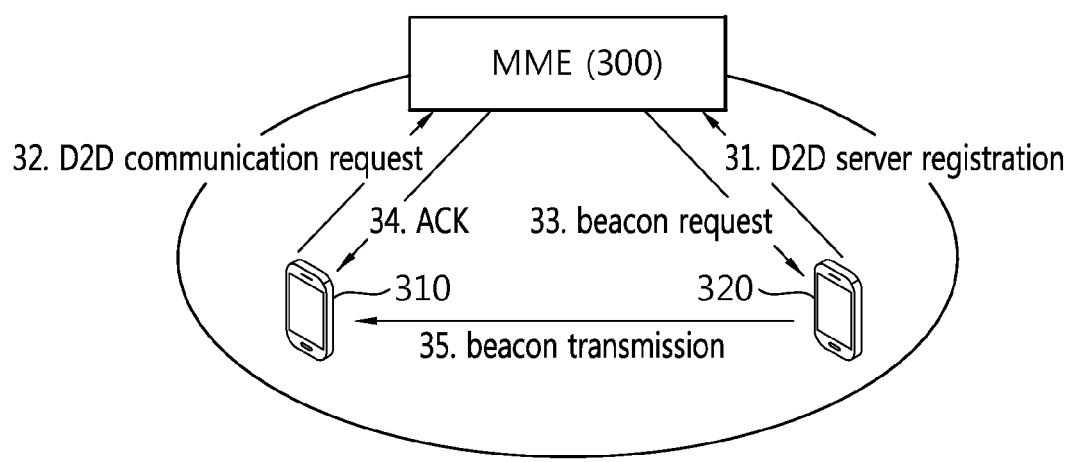
FIG. 3 schematically illustrates a peer discovery procedure using a network entity in a wireless communication system to which the present embodiment is applied.

FIG. 3 schematically illustrates a peer discovery procedure using a network entity in a wireless communication system to which the present invention is applied. This is one of the A-priori peer discovery techniques, and a method of searching UE through register/request processes to the network entity will be described.

Referring to FIG. 3, first, a server UE 310 that is going to send beacon notifies that the D2D communication is available to an MME 300, and simultaneously, registers its UE and service information (step, 31). When receiving a request from a client UE that the D2D communication is available, the MME 300 requests to send beacon to the D2D server UE by verifying if there is a server UE to communicate with the corresponding client UE based on the information of server UE which is registered (steps, 32 and 33). The server UE sends the requested beacon and the client UE receives this such that the D2D search procedure is available (steps, 34 and 35). Herein, the MME has the access information of UE or the information of UE's capacity, and the information is mainly used for the mobility management of UE. Accordingly, the method of FIG. 3 provides more information during the peer discovery procedure than that of in FIG. 2, and thereby the UEs may save resources consumed in the peer discovery.

Meanwhile, the A-posteriori peer discovery technique signifies a technique that each UE performs the peer discovery by targeting the UE existed in the same eNB among different UEs having a session which is already generated. That is, in the A-posteriori peer discovery technique, the peer discovery is, different from the A-priori peer discovery technique of searching arbitrary UEs nearby, a process of verifying whether there is a UE, which already has a session, located within a range where D2D communication is available with its own. In this reason, the A-posteriori peer discovery technique includes a method of using token and a method of analyzing internet protocol (IP) address according to a method of determining if two UEs that have a session exist in the same eNB. Hereinafter, this will be described through FIG. 4 and FIG. 5.

Figure 4:
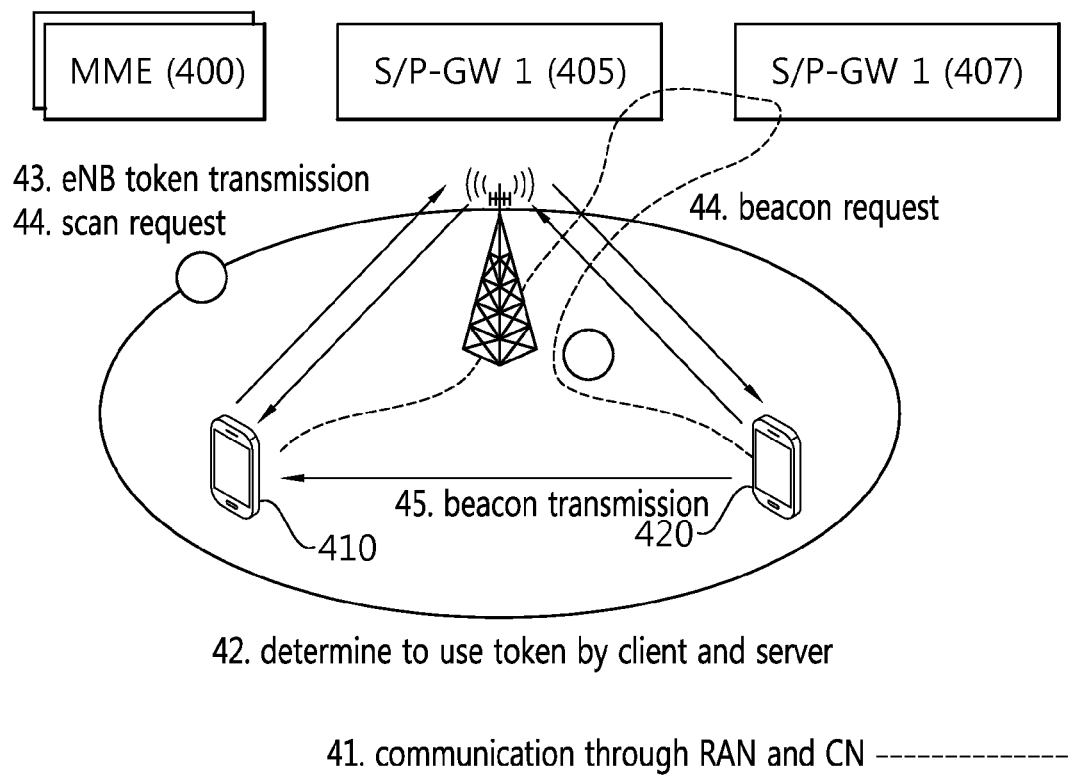
FIG. 4 schematically illustrates a peer discovery procedure using a token technique in a wireless communication system to which the present embodiment is applied.

FIG. 4 schematically illustrates a peer discovery procedure using a token technique in a wireless communication system to which the present invention is applied.

Referring to FIG. 4, the search technique using the token is a method of determining whether there exist two UEs that have a session in the same eNB using a distinctive token which is distinguishable by the eNB. When the UEs 410 and 420 that have a session, that is, the UEs that perform a communication through a radio access network (RAN) and a core network (CN) (step, 41) exchange tokens using the session of communication, the eNB may know the two UEs that have a session are in the same eNB by distinguishing the tokens (step, 42). If it is determined that two UEs are in the same eNB, the eNB requests one UE to transmit a beacon (step, 43) and requests another UE to receive the beacon (step, 44). If the beacon is properly received (step, 45), two UEs successfully complete the peer discovery and are determined to be located in the range where the D2D communication is available.

Herein, according to LTE system, the combination of E-UTRAN and EPC is called an evolved packet system (EPC), and the traffic flow that is ranged from all of wireless links through which the UEs 410 and 420 access the eNB to a packet data network that is connected to a service entity may be operated based on internet protocol (IP). An S-GW is a gateway having an endpoint of E-UTRAN, and a P-GW is a gateway having an endpoint of a packet data network. Through this, the flow of packet traffic of UEs is controlled by start/end. Thus, an MME 400 exchanges operation and management (OAM) information for supporting movement of UEs 510 and 520 with S-GW 505/P-GW 507 through S1-U. Through this, the flow of packet data according to movement of UE is controlled.

Figure 5:
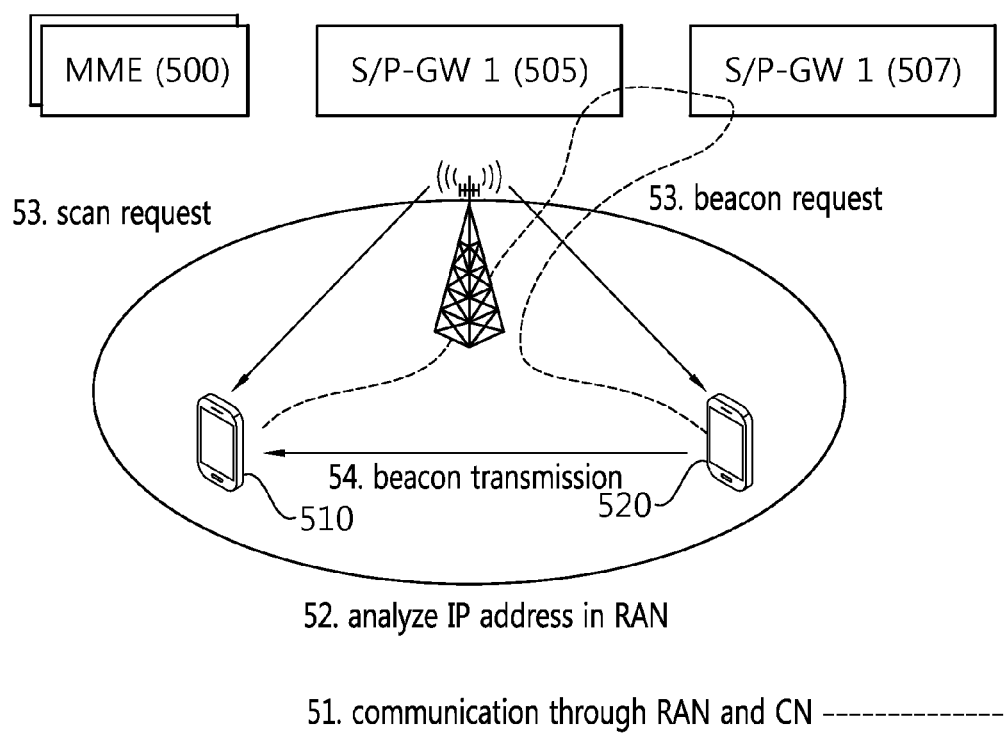
FIG. 5 schematically illustrates a peer discovery procedure considering an internet protocol address in a wireless communication system to which the present embodiment is applied.

FIG. 5 schematically illustrates a peer discovery procedure considering an internet protocol address in a wireless communication system to which the present invention is applied.

Referring to FIG. 5, a search technique using IP address analysis is a method of verifying if a transmission UE and a reception UE are in the same eNB by analyzing an IP address of a session. For the UEs that has a session generated (step, 51), that is, for the UEs that perform communication through the RAN and the CN, if two UEs are determined to be in the same eNB through the IP address analysis in S/P-gateway (GW), like the method of using tokens, the eNB requests one UE to transmit a beacon and requests another UE to receive the beacon (step, 53). If the beacon is successfully received, it is determined that the peer discovery is successful and the D2D communication is available (step, 54).

Hereinafter, on the basis of the aforementioned example or the like, the present specification describes a D2D technique required to support a sales service such as an advertisement, a product sales, a promotion, etc., as one of proximity based services (ProSe). For example, the D2D technique can be provided in which a street shop (a seller) sends an advertisement having a specific purpose to a customer who passes thereby and the customer who has received this acquires a desired product at a desired price through proper bargaining or negotiation.

A technique proposed in the present specification performs information exchange (D2D communication) between customers who desire to purchase products in order to satisfy product (or service) purchase requirements of sellers in an environment consisting of a plurality of sellers and a plurality of customers/buyers. Accordingly, a state in which the product purchase requirement can be satisfied is made by sharing their information with each other as much as possible. In addition, it is proposed an environment for bargaining with sellers over a product by using the aforementioned operation, a technical method for supporting the environment, and a D2D technique for supporting the technical method.

A technical feature of the present specification is that, in order to avoid a difficulty in the conventional negotiation or bargaining process or calculation process in which a user directly participates, an intelligent UE takes most of roles thereof. A user of a D2D UE delivers only an essential requirement such as a user's purpose, price, etc., to the UE. Alternatively, when the D2D UE recognizes a corresponding requirement, the D2D UE discovers a seller (a product or service seller) according to a desired purpose of the user, and selects a product having an appropriate quality and price. In addition, when necessary, the product is finally acquired through a negotiation process. Accordingly, the user can avoid a difficulty which may be experienced personally, and also can reasonably purchase a desired product while maintaining decency.

Figure 6:
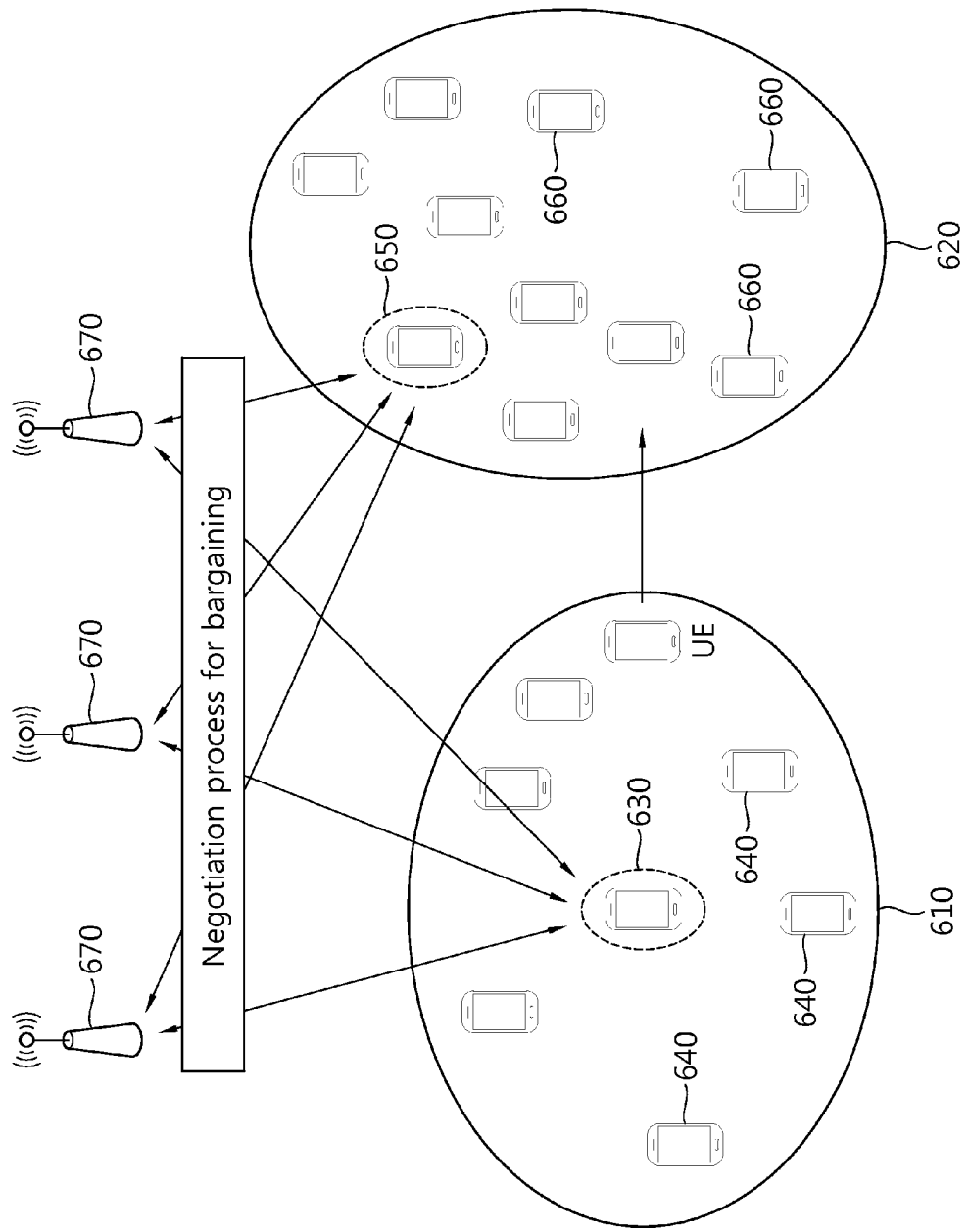
FIG. 6 illustrates the concept of transmitting/receiving negotiation information with respect to a seller device on the basis of a device to device (D2D) user equipment (UE) group.

FIG. 6 illustrates the concept of transmitting/receiving negotiation information with respect to a seller device on the basis of a D2D UE group.

Three seller devices 670 shown in the figure transmit an advertisement to sell a product or a service. A plurality of customer devices 640 and 660 intending to purchase this product may create a group to purchase it as low price as possible. Such a group is hereinafter referred to as D2D UE groups 610 and 620. One UE of the D2D UE group may be designated as a negotiator. The negotiator may be referred to as group leader devices 630 and 650. Through each of the group leader devices 630 and 650, price bargaining may be performed with respect to each seller device 670 to purchase a product by using the seller device 670 which provides the most excellent service at the lowest price.

For example, in case of a cinema, a theater, etc., where a plurality of sellers are present and a plurality of buyers are present and thus a group negotiation is achieved or a sales promotion is provided such as a group discount, buyers who do not know each other may become friends through D2D communication and may create at least a specific number of groups. In this case, it is possible to buy tickets in group by satisfying a requirement of the group discount and to share the tickets. Such a series of process is preferably performed autonomously and intelligently by a D2D UE. That is, preferably, a user inputs only a minimum amount of information, and the remaining processes are automatically handled by the D2D UE.

Such a procedure is possible through a free negotiation between a seller device and a customer device. Such a free negotiation can be implemented in an easier and more effective manner by using a D2D communication technique. For this, there is a need to transmit/receive various types of control signals and information.

In order to support the free negotiation process, a discount or complaint signaling information is required. In addition, there is a need to design a group discount signal as well according to a service implementation method. The signaling information can be implemented using a physical-layer signal or can be implemented using a higher-layer signal. A conversation sentence required in a process of negotiating with a real person will be directly implemented using a signal so that a negotiation proceeds intelligently through an exchange between D2D UEs. The person may input or configure a necessary requirement through a UE manipulation. Alternatively, in case of an intelligent UE, a current state or situation of the person may be recognized to perform a negotiation process and bargaining conforming thereto, thereby finally obtaining a desired product and service.

Signaling information required for such a negotiation may be as follows.

1) An advertisement signal including product information and a discount offer may be included. More specifically, a product and other attribute information are digitalized and are then delivered by being converted into a physical-layer and higher-layer signal.

2) A signal requested by a buyer UE to a seller may be included. Examples thereof include a discount signal and a negotiation signal. Whether to offer a discount may be asked and a discount rate may be asked, or negotiation information indicating how much a user can concede may be delivered.

3) A response signal of a seller or sellers for the above signal may be included. It is transmitted a signal including information indicating a maximum discount rate and compensation information such as a risk factor, a restriction factor, etc., depending on a discount benefit.

4) By repeating the above steps 2) and 3), a product is purchased when conforming to an input parameter configured by a user, and the purchase is given up when not conforming to the input parameter. When a deal is complete, there is a need for a signal for reporting the completion of the deal.

5) When a mutual condition is satisfied and thus the deal is complete, a ticket is received as a subsequent operation. There is a case where the ticket is collectively received by a representative of a group, i.e., the group leader devices 630 and 650, and then is distributed to each member UE, and a case where the seller device 670 directly recognizes the group and individually delivers it to a member of the group. In the latter case, if group information is informed to the seller, the seller identifies an individual UE ID and distributes the ticket to each individual. If the ticket is received by the group leader devices 630 and 650, a group leader must know information of a group member who has joined in this negotiation (such information may be stored in advance when creating a group (subscription/unsubscription), and may be deleted when unsubscribing from the group). Once a deal is complete, a group ticket can be received from a seller device, and this ticket is allowed to be shared by a plurality of group members.

6) Payment must be complete to receive the ticket. The payment must be processed safely irrespective of whether the payment is achieved through the group leader device or individually. When the payment is achieved individually, the payment can proceed similarly to individual business transaction, and when the payment is achieved by the group leader device, the group leader device may calculate individual prices, report the result to each group member, receive a confirm message for confirming the prices, request an individual price, and concurrently perform the payment by collecting the individual prices. In this case, an additional algorithm may be requested for payment between individuals (i.e., a group leader device and a group member). Alternatively, an actual payment process may be performed directly by an individual UE with respect to a seller device. In case of direct payment, an external server may be provided to ensure mutual reliability, or any UE may take such a role in a D2D service discovery process. For example, the seller device may perform such an authentication service.

7) If one UE which creates a group gives up final payment and thus cannot satisfy a basic condition of a group discount or the like, the existing benefit may be all restored or the sales may be cancelled.

In the above negotiation process, a signal having a special purpose such as a group discount or the like may be added. This may be expressed as a group discount signal, and may be transmitted to a plurality of sellers so that a seller who offers a lowest price and a seller who offers a best service (it may differ according to a user input requirement) can be selected.

In the above negotiation process, a plurality of D2D UE groups 610 and 620 may be created according to a purpose. A customer device may select a group suitable for its purpose and join the group by sending a signal in the hope of belonging to the group. Each group may be created for a different purpose. For example, a certain group puts priority on a price, a certain group puts priority on quality, and a certain group allows the price and the quality to be present in a range of a certain level. As such, a group having various purposes and attributes may be created. If the customer device intelligently accesses to such a group in order to be a member of the group, a user must input a configuration such as a user's preference, taste, purpose, time, urgency, etc., in advance. In addition, an intelligent UE itself may be allowed to recognize and acquire all necessary information of the user to purchase a final product desired by the user. A UE belonging to a specific group may move to another group according to market information (a seller's prices change, a target buyer's preference change of a group, an intention of the user, a taste, a necessity, etc.) which changes according to a time flow. This is because it is determined that moving to another group is more appropriate to a feature of the user than staying in a current group. In order to perform such a group movement, information is requested for a peer group, and is compared with information of a group to which the UE belongs, and if it is determined that the comparison result conforms to a benefit of the UE, the group is moved, for example, by declaring an intention of moving to the peer group.

Figure 7:
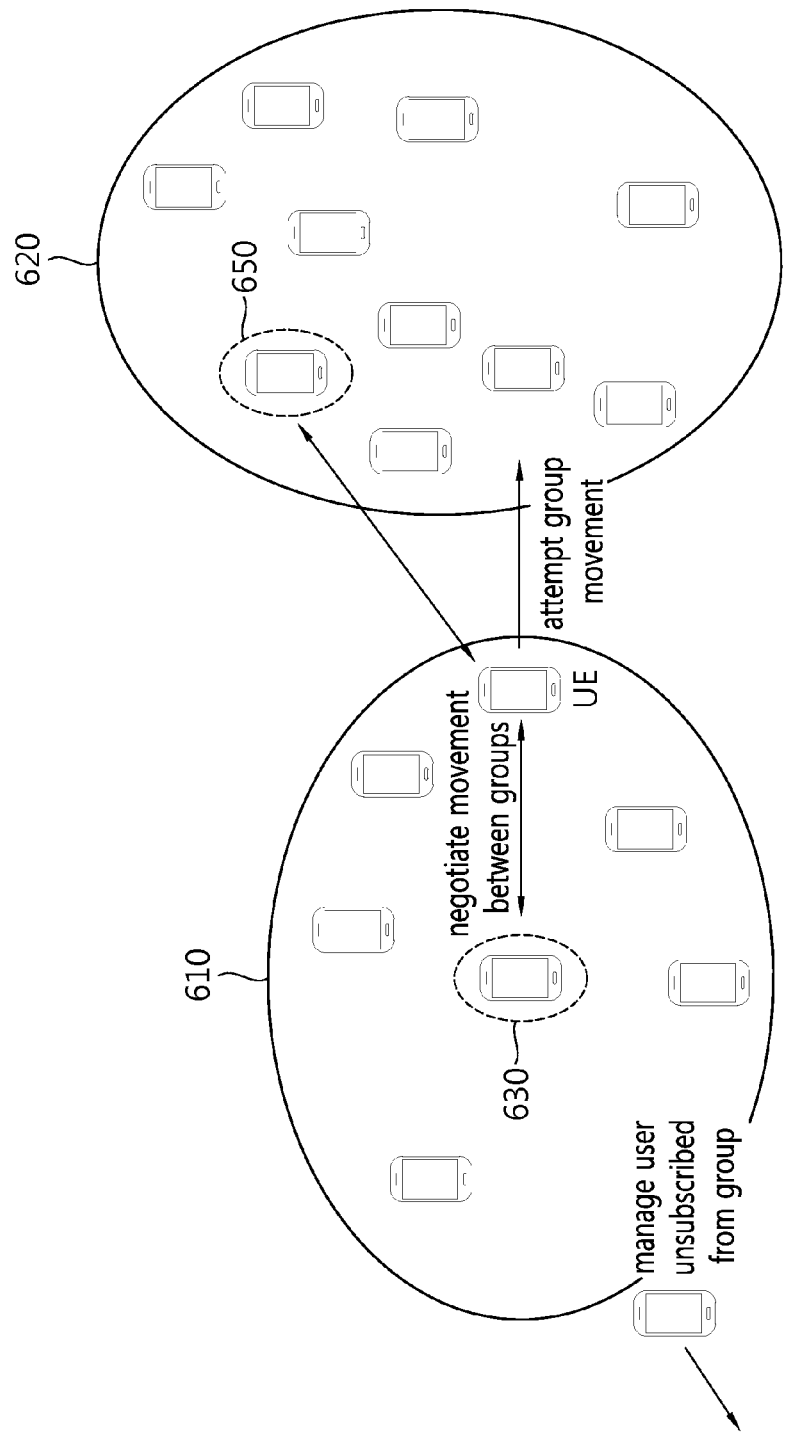
FIG. 7 shows the concept of a group movement.

FIG. 7 shows the concept of the group movement. Before declaring the intention of moving, a UE may give up the moving through negotiation in a process of declaring the intention of moving to a group leader device to which the UE belongs. This is a case where a better condition is proposed. However, if a purpose of a group, intended by a group, cannot be achieved when a current UE moves, a good condition may be offered to a UE which intends to move, in order to avoid an unsubscription from the group. If a discount rate differs depending on the number of group members, since a response may be sensitive to its threshold value or the like, there is a need to make an effort to manage a proper number of UEs in a group. The aforementioned series of operations are performed intelligently by the UE, and preferably, only a minimum intervention of the user is allowed. That is, many steps of a purchasing process are preferably performed automatically by the UE without an intervention of the user. However, a boundary of a process intervened by the user may be defined differently according to a service to be implemented. The invention of the user is smaller in an intelligent UE.

A multipurpose ticket sales is possible as another type of a service using a D2D technique. That is, when a multipurpose electronic ticket is purchased, proximity available service information for a case where a buyer is located in a ProSe service region is reported together with information on a service (play, movie, meal, etc.) that can be actually enjoyed using the ticket. This is a service model in which, while carrying a kind of a blank ticket (i.e., a ticket that can be used for a multipurpose when necessary within a service range agreed when it is purchased), a buyer receives a real-time based advertisement service or promotion event (e.g., a ticket discount or a free ticket) provided by a service vendor around there, and selects a desired service among them and enjoys the service. For example, a user who has purchased a blank ticket receives information (a service provided only to a blank ticket member) such as information on a show to be performed soon, seat information, discount rate information, etc., while located around a concert hall, and can enjoy it at a discounted price if there is a service/show suitable for the user (even a free show may be provided).

Herein, in the D2D technique, ticket sales information is delivered to a member located nearby, a D2D UE selects and receives an advertisement suitable for a predetermined condition, and a service suitable for a determined/input condition is purchased.

The signal is implemented by transmitting a physical-layer signal, and also may be implemented by using a higher layer.

Since the aforementioned seller device 670, customer devices 640 and 660, and group leader devices 630 and 650 transmit/receive various signals through a D2D link, it is preferably performed by considering power consumption of each communication device. Hereinafter, it is described a specific procedure in which each device performs communication by considering power consumption.

First, the group leader devices 630 and 650 may include the plurality of customer devices 640 and 660 into the specific D2D UE groups 610 and 620. In this case, as described above, whether to be included in the D2D UE group may be determined according to various conditions. Hereinafter, it is described an example of creating a D2D UE group according to price information.

For example, a user of the group leader devices 630 and 650 may include other users who desire to purchase a product at a specific price into a group. In this case, the user stores specific price information into the group leader devices 630 and 650.

Figure 8:
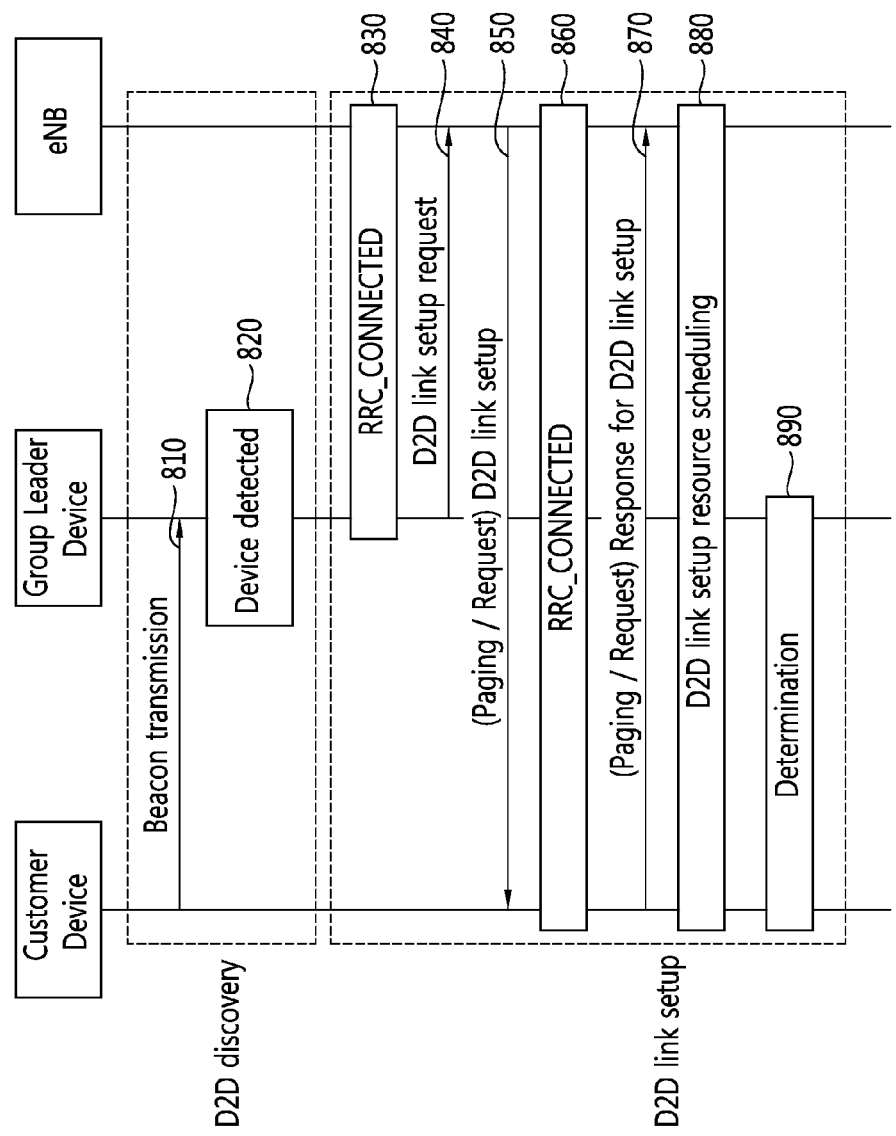
FIG. 8 is a flowchart for explaining a signal processing method between a group leader device and a customer device so that the customer device is included in a D2D UE group.

FIG. 8 is a flowchart for explaining a signal processing method between a group leader device and a customer device so that the customer device is included in a D2D UE group.

First, the (candidate) customer device may transmit a discovery signal in an RRC idle mode from the group leader device (step 810). For example, after power is first supplied, the customer device or the group leader device may discover a proper cell first and thereafter may be in an RRC_idle state in the cell, or may be in a state of entering an RRC_idle mode from the previous RRC_connected mode. A discovery signal related to a D2D link may be implemented in a form of a beacon message.

The customer device may be identified by the group leader device by using the discovery signal (step 820). The group leader device may set up an RRC connection with respect to an eNB in such a manner that a random access is performed on the eNB (step 830). If the RRC connection is set up, the group leader device transmits to the eNB a D2D link setup request message to set up a D2D link with respect to the customer device (step 840). As described above, since the beacon message described in step 810 includes a variety of information such as a UE ID, service ID, application ID, emergency state ID, etc., of the customer device, the group leader device may request to set up the D2D link with respect to the customer device, while delivering information regarding the customer device to the eNB through step 840.

In response to the request based on step 840, the eNB transmits a paging message to the customer device (step 850). In response to the paging message, an RRC connection between the customer device and the eNB is set up in the customer device (step 860), and in response to step 850, a response message for the paging is transmitted (step 870).

The eNB allocates a temporal link setup resource, which is allocated in a dedicated manner for a D2D link, to the group leader device and customer device which have transitioned to the RRC_connected mode (step 880). That is, resource allocation of the group leader device and customer device may be determined in a centralized manner.

After allocating a resource designated for each communication device, the group leader device and the customer device set up the D2D link, and determine whether to include the customer device into the D2D UE group of the group leader device through the resource (step 890).

In case of determining on the basis of price information, a user of the (candidate) customer device stores temporal price information regarding a specific product/service in advance, and the temporal price information may be delivered to the group leader device in step 890. In this case, if the temporal price information which is input to the (candidate) customer device matches to price information which is predetermined by the group leader device, the customer device may be included in the D2D UE group.

Even if the temporal price information which is input to the customer device does not completely match to the price information which is predetermined by the group leader device, when a price difference is within an error range which is predetermined by the group leader device and/or the customer device, the customer device may be included in the D2D UE group, and instead, the group leader device may negotiate with the seller device according to a predetermined price.

If steps 810 to 890 are repeated as described above, a plurality of customer devices which desire negotiation with the seller device may be included in the group leader device at the same price.

Figure 9:
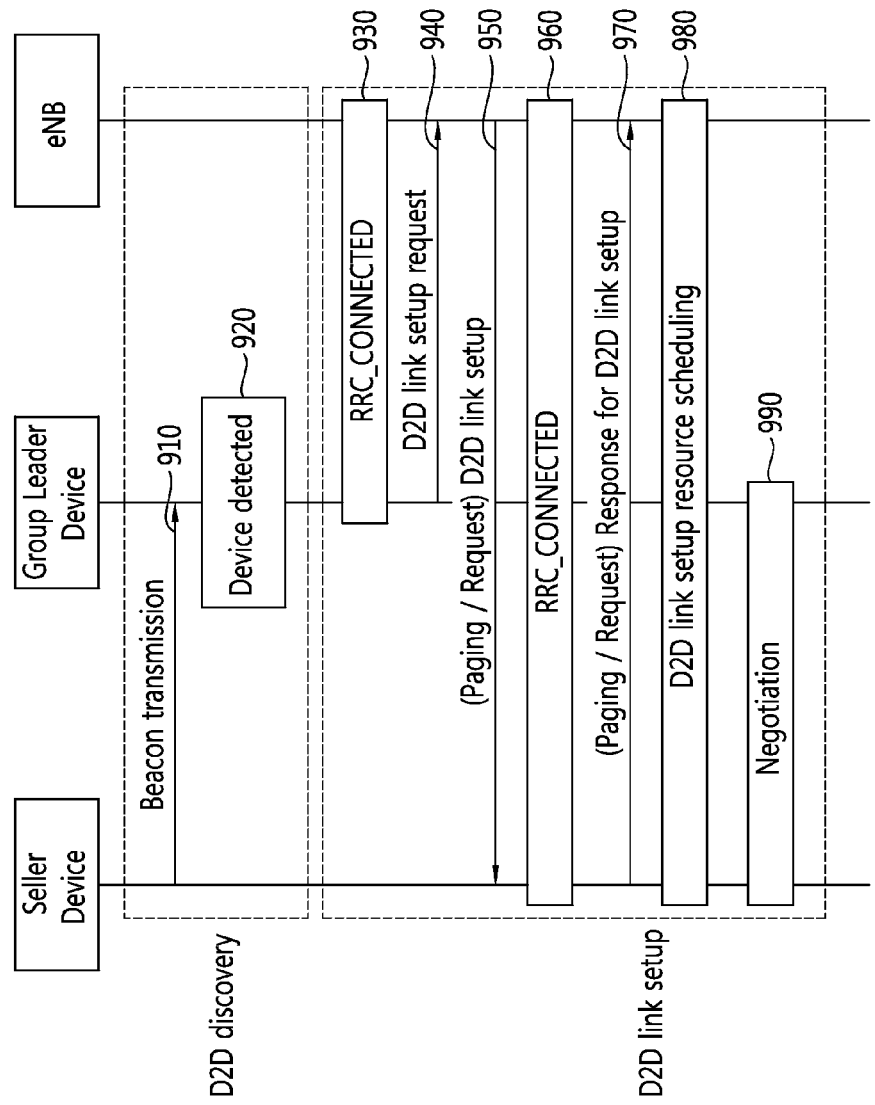
FIG. 9 is a flowchart illustrating a signal processing method in case of negotiating with a seller device after a D2D UE group is created.

FIG. 9 is a flowchart illustrating a signal processing method in case of negotiating with a seller device after a D2D UE group is created.

Through the aforementioned procedure of FIG. 8, a group leader device may create the D2D UE group in which a plurality of customer devices are included as a member. The D2D UE group may attempt to purchase a product or a service at the same price. In this case, the group leader device may negotiate with a seller by providing the seller device with information regarding the D2D UE group and negotiation information of the group leader device. That is, a purchase price desired by a customer is specified in the negotiation information of the group leader device, and the total number of customers who desire to purchase or the like is specified in the information regarding the D2D UE group. Accordingly, the seller can provide a product/service to the customer on a more favorable condition by considering a factor such as a volume discount or the like.

A more detailed operation will be described below with reference to FIG. 9.

A seller device may transmit a discovery signal in an RRC idle mode from a group leader device (step 910). The seller device may be identified by the group leader device by using the discovery signal (step 920). The group leader device may set up an RRC connection with respect to an eNB in such a manner that a random access is performed on the eNB (step 930). If the RRC connection is set up, the group leader device transmits to the eNB a D2D link setup request message to set up a D2D link with respect to the seller device (step 940).

In response to the request based on step 940, the eNB transmits a paging message to the seller device (step 950). In response to the paging message, an RRC connection between the seller device and the eNB is set up in the seller device (step 960), and in response to step 950, a response message for the paging is transmitted (step 970).

The eNB allocates a temporal link setup resource, which is allocated in a dedicated manner for a D2D link, to the group leader device and seller device which have transitioned to the RRC_connected mode (step 980). That is, resource allocation of the group leader device and seller device may be determined in a centralized manner.

After allocating a resource designated for each communication device, the group leader device and the seller device set up the D2D link, and attempt negotiation in such a manner that related information is provided to the seller device (step 990). As described above, since the information provided to the seller device includes information regarding the D2D UE group and includes negotiation information of the group leader device, a specific price and a specific amount of products/services to be provided to the D2D UE group are specified. Accordingly, even if a user of the group leader device requests a price much lower than an average price, the seller may determine whether to sell to the D2D UE group on a favorable condition on the basis of information regarding the D2D UE group.

Figure 10:
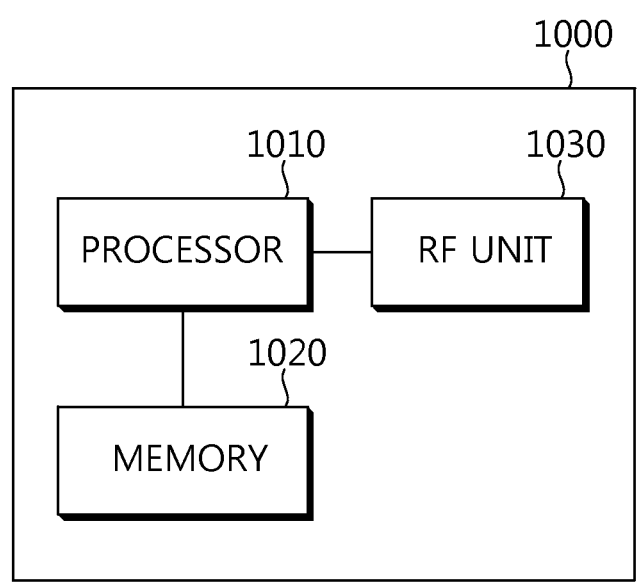
FIG. 10 is a block diagram showing a structure of a communication device according to the present embodiment.

FIG. 10 is a block diagram showing a structure of a communication device according to the present embodiment. The communication device may be implemented as a part of a UE, and may also be implemented as a part of an eNB, an HeNB, and an HNB. It may be implemented as a part of a core network (CN). A wireless device 1000 may include a processor 1010, a memory 1020, and a radio frequency (RF) unit 1030.

The processor 1010 may be configured to implement the aforementioned functions, procedures, and methods. Layers of a radio interface protocol may be implemented in the processor. The processor 1010 may perform a procedure for driving the aforementioned operation.

The processor 1010 may include an application-specific integrated circuit (ASIC), a separate chipset, a logic circuit, and/or a data processing unit. The memory 1020 may include a read-only memory (ROM), a random access memory (RAM), a flash memory, a memory card, a storage medium, and/or other equivalent storage devices. The RF unit 1030 may include a base-band circuit for processing a wireless signal. When the embodiment is implemented in software, the aforementioned methods can be implemented with a module (i.e., process, function, etc.) for performing the aforementioned functions. The module may be stored in the memory 1020 and may be performed by the processor 1010. The memory 1020 may be located inside or outside the processor 1010, and may be coupled to the processor 1010 by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a group leader device supporting a device-to-device (D2D) service in a wireless communication system including a seller device and a customer device which support the D2D service, the method comprising:

creating, by the group leader device, a D2D user equipment (UE) group in which the customer device is included as a member;

receiving, by the group leader device which is in a radio resource control (RRC) idle mode, a first discovery signal from the seller device in the group leader device which is in a radio resource control (RRC) idle mode;

establishing an RRC connection between a base station and the group leader device in response to the discovery signal;

after the RRC connection is established between the base station and the group leader device, transmitting to the base station a D2D link setup request message for setting up a D2D link between the seller device and the group leader device on the basis of identification information of the seller device;

setting up a D2D link between the seller device and the group leader device by using a resource scheduled by the base station;

transmitting group information related to the D2D UE group and negotiation information of the group leader device to the seller device through the D2D link between the seller device and the group leader device; and receiving response information regarding the group information and the negotiation information from the seller device through the D2D link between the seller device and the group leader device, wherein the creating of the D2D UE group comprises:

receiving, by the group leader device which is in the RRC idle mode, a second discovery signal from the customer device supporting the D2D service;

establishing an RRC connection between the group leader device and the base station in response to the second discovery signal;

after the RRC connection is established between the group leader device and the base station, requesting resource allocation for a D2D link between the customer device and the group leader device, on the basis of identification information for the customer device;

receiving temporal negotiation information of the customer device through the D2D link between the customer device and the group leader device; and if the temporal negotiation information corresponds to negotiation information of the group leader device, allowing the candidate device to be included in the D2D UE group, wherein the first discovery signal from the seller device to the group leader device is an advertisement signal, wherein the D2D link between the customer device and the group leader device is set up, and wherein the customer device is allowed to be included in the D2D UE group when a price difference between price information included in the temporal negotiation information and price information included in the negotiation information of the group leader device is within an error range which is predetermined by the group leader device.

2. The method of claim 1, wherein the temporal negotiation information of the customer device is price information which is input by a user of the customer device, and wherein the negotiation information of the group leader device is price information which is input by a user of the group leader device.

3. The method of claim 1, wherein the group information related to the D2D UE group includes information regarding a total number of customer devices included in the D2D UE group.

4. The method of claim 3, wherein the total number of customer devices included in the D2D UE group is managed according to a discount rate.

5. The method of claim 1, wherein the customer device belonging to the D2D UE group moves to another D2D UE group according to price change of the seller device, preference change of the customer device, and an intention of the customer device.

6. A communication device for a group leader device supporting a device-to-device (D2D) service in a wireless communication system including a seller device and a customer device which support the D2D service, comprising:

a radio signal processing unit for processing a radio signal; and a control unit for controlling the radio signal processing unit, wherein the control unit is configured to:

create a D2D UE group in which the customer device is included as a member;

receive, while in a radio resource control (RRC) idle mode, a first discovery signal from the seller device;

establish an RRC connection between a base station and the group leader device in response to the discovery signal;

after the RRC connection is established between the base station and the group leader device, transmit to the base station a D2D link setup request message for setting up a D2D link between the seller device and the group leader device on the basis of identification information of the seller device;

set up a D2D link between the seller device and the group leader device by using a resource scheduled by the base station;

transmit group information related to the D2D UE group and negotiation information of the group leader device to the seller device through the D2D link between the seller device and the group leader device; and receive response information regarding the group information and the negotiation information from the seller device through the D2D link between the seller device and the group leader device, and wherein, while creating the D2D UE group of the control unit is further configured to:

receive, while in the RRC idle mode, a second discovery signal from the customer device supporting the D2D service;

establish an RRC connection between the group leader device and the base station in response to the second discovery signal;

after the RRC connection is established between the group leader device and the base station, request resource allocation for a D2D link between the customer device and the group leader device, on the basis of identification information for the customer device;

receive temporal negotiation information of the customer device through the D2D link between the customer device and the group leader device; and if the temporal negotiation information corresponds to negotiation information of the group leader device, allow the customer device to be included in the D2D UE group, wherein the first discovery signal from the seller device to the group leader device is an advertisement signal, wherein the D2D link between the customer device and the group leader device is set up, and wherein the customer device is allowed to be included in the D2D UE group when a price difference between price information included in the temporal negotiation information and price information included in the negotiation information of the group leader device is within an error range which is predetermined by the group leader device.

* * * * *